(12) United States Patent
Ozeki et al.

(10) Patent No.: US 7,026,066 B2
(45) Date of Patent: Apr. 11, 2006

(54) ELECTRONIC APPARATUS USING FUEL CELL

(75) Inventors: Akihiro Ozeki, Ome (JP); Shogo Hachiya, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 374 days.

(21) Appl. No.: 10/320,541

(22) Filed: Dec. 17, 2002

(65) Prior Publication Data

US 2003/0143450 A1 Jul. 31, 2003

(30) Foreign Application Priority Data

Jan. 29, 2002 (JP) ............... 2002-020362

(51) Int. Cl.
*H01M 8/04* (2006.01)
*H01M 2/12* (2006.01)

(52) U.S. Cl. .............. 429/34; 429/39; 429/71; 429/83

(58) Field of Classification Search .......... 429/26, 429/34, 38, 39, 71, 82, 83
See application file for complete search history.

(56) References Cited

U.S. PATENT DOCUMENTS

| 3,160,528 | A  | * | 12/1964 | Dengler et al. ............... 429/22 |
| 5,962,155 | A  | * | 10/1999 | Kuranaka et al. ......... 429/26 X |
| 6,057,051 | A  | * | 5/2000  | Uchida et al. ............ 429/34 X |
| 6,649,298 | B1 | * | 11/2003 | Hayashi et al. ............... 429/34 |
| 6,783,882 | B1 | * | 8/2004  | Schmidt ...................... 429/34 |

FOREIGN PATENT DOCUMENTS

| JP | 09-213359 | 8/1997 |
| JP | 2001-332287 | 11/2001 |

\* cited by examiner

*Primary Examiner*—Stephen J. Kalafut
(74) *Attorney, Agent, or Firm*—Finnegan, Henderson, Farabow, Garrett & Dunner, L.L.P.

(57) ABSTRACT

An electronic apparatus includes a hollow main body. This main body is powered by a fuel cell which generates a vapor-containing gas during operation. The vapor-containing gas generated by the fuel cell is made to flow along a predetermined passage by a cooling fan and is discharged from a discharge port formed in the main body.

10 Claims, 6 Drawing Sheets

ELECTRONIC APPARATUS USING FUEL CELL

CROSS-REFERENCE TO RELATED APPLICATIONS

This application is based upon and claims the benefit of priority from the prior Japanese Patent Application No. 2002-020362 filed Jan. 29, 2002, the entire contents of which are incorporated herein by reference.

BACKGROUND OF THE INVENTION

1. Field of the Invention

The present invention relates to an electronic apparatus using a fuel cell, such as a portable electronic apparatus.

2. Description of the Related Art

In recent years, it is proposed to use a fuel cell in a notebook personal computer (hereinafter referred to as notebook PC), which is an example of a personal electronic apparatus. The fuel cell is advantageous in that it can produce power unlimitedly as long as it is fueled.

Cell batteries of various types are known, and a DMFC (direct methanol fuel cell) is one of the known types. The DMFC is a fuel cell which uses methanol as its liquid fuel (methanol is comparatively low in price and is easy to handle).

In general, a DMFC comprises the following: a fuel tank which contains a high concentration of methanol; a mixing tank in which the methanol supplied from the fuel tank is diluted with water; a liquid-supply pump which supplies the methanol diluted in the mixing tank toward the anode of a fuel cell panel; and an air-supply pump which supplies air toward the cathode of the fuel cell panel.

When supplied with the methanol and air, the fuel cell panel generates power between the anode and the cathode. At the time, the anode and the cathode produce carbon dioxide and water, respectively.

The carbon dioxide produced by the anode and the water produced by the cathode are returned to the mixing tank. Of these, the water is used for diluting the methanol supplied from the fuel tank. An extra amount of water is turned into vapor and discharged from the mixing tank together with the carbon dioxide.

The fuel cell is provided inside the main body of the notebook PC. Where the fuel cell is provided inside the main body, the vapor-containing carbon dioxide discharged from the mixing tank of the fuel cell may condense on the main board in the main body or on electronic components (e.g., a CPU) provided on the main board. Such condensation is undesirable because it adversely affects the performance required of the electronic components.

BRIEF SUMMARY OF THE INVENTION

The present invention is to provide an electronic apparatus wherein vapor exhausted from the fuel cell is prevented from condensing on electronic components inside the main body.

According to one aspect of the present invention, there is provided an electronic apparatus comprising:
a main body;
a fuel cell configured to supply power to the main body and generating vapor-containing gas during operation; and
a fan configured to exhaust air and the vapor-containing gas generated by the fuel cell from the main body through a port formed in the main body.

According to the electronic apparatus described above, the vapor-containing gas generated from the fuel cell is discharged from the main body by the cooling fan provided for the main body.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

FIGS. 1 through 5 illustrate the first embodiment of the present invention.

Figure 1:
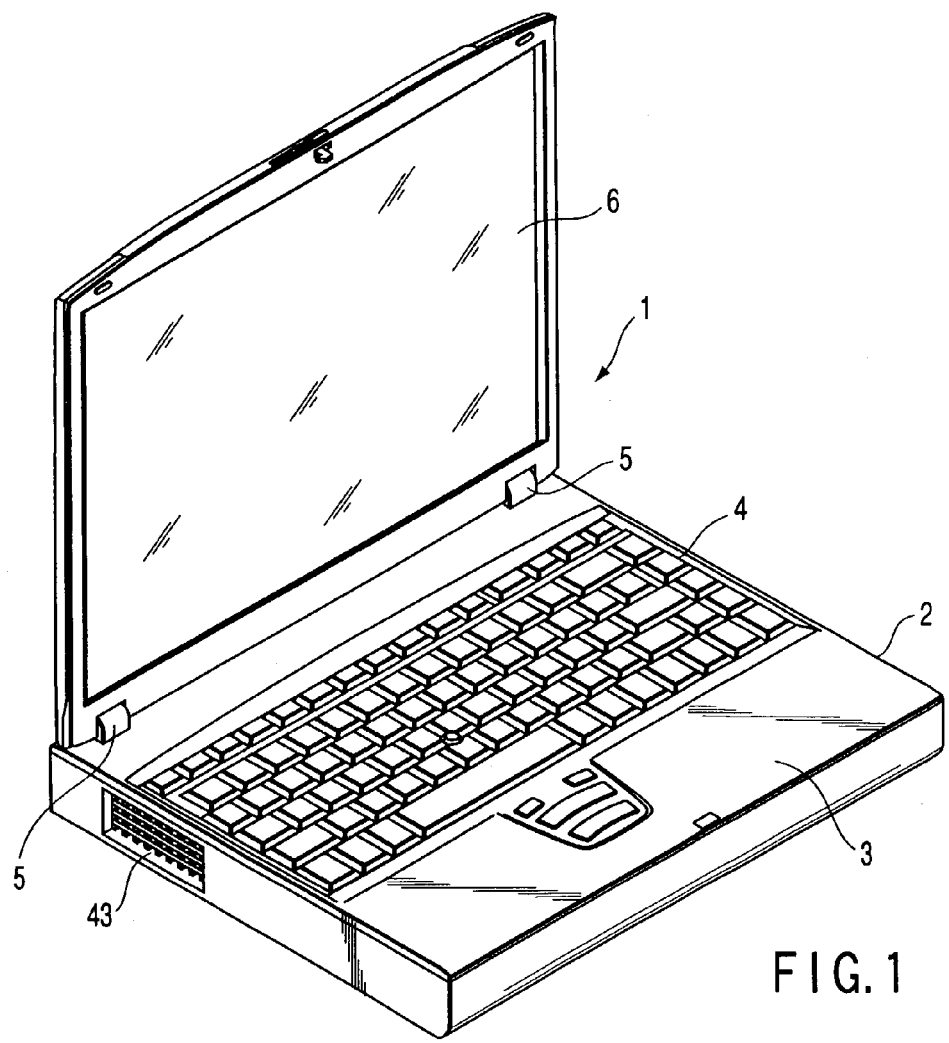
FIG. 1 is a perspective view of a notebook PC according to one embodiment of the present invention.

FIG. 1 shows a notebook PC 1, which is an example of a portable electronic apparatus. The notebook PC 1 comprises a hollow main body 2. A palm rest 3 is formed on the front portion of the main body 2, and a keyboard 4 is located behind the palm rest 3.

A pair of hinges are provided on the rear portion of the upper surface of the main body 2. A liquid crystal display 6 is rotatably coupled to the main body 2 by means of the hinges.

Figure 5:
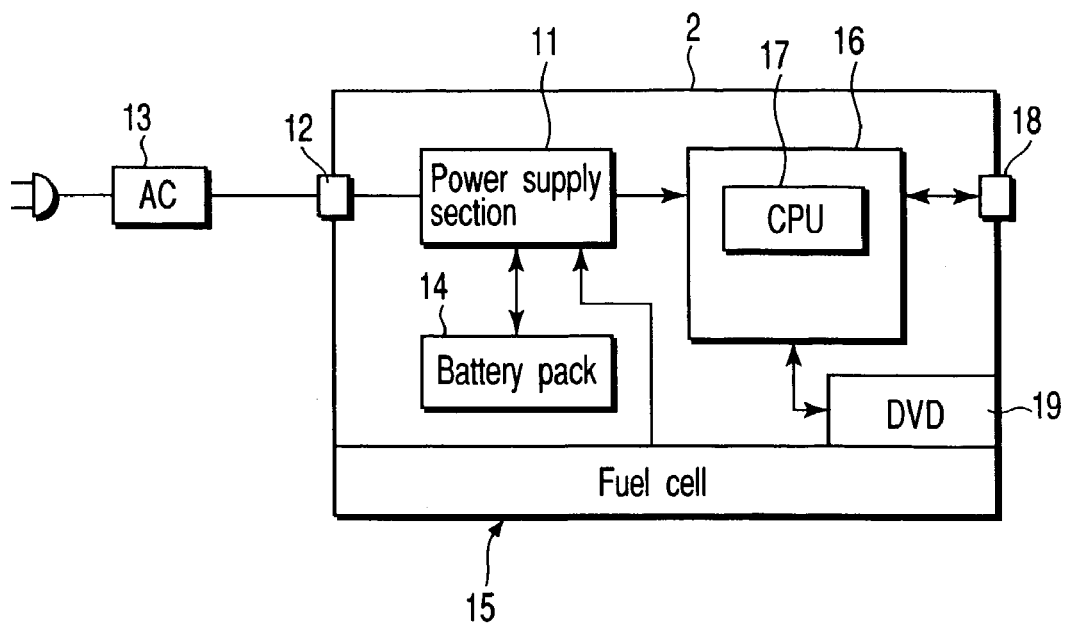
FIG. 5 is an explanatory diagram illustrating how the notebook PC is powered.

As FIG. 5 shows, a power supply section 11 is located inside the main body 2. The power supply section 11 is powered by an AC adaptor 13 connected to an AC connector 12. The AC connector 12 is provided, for example, on the rear face of the main body 2.

The power supply section 11 can be powered not only by the AC adaptor 13 described above but also by a secondary battery pack 14 and a fuel cell 15, both incorporated in the main body 2. A changeover switch (not shown) determines which element, the AC adaptor 13, the battery pack 14 or the fuel cell 15, is used for applying power to the power supply section 11.

The power supply section 11 applies power to a main board 16 including electronic components. A CPU 17 is mounted on the main board 16. A modem 18, a DVD 19, etc. are connected to the main board 16.

Figure 2:
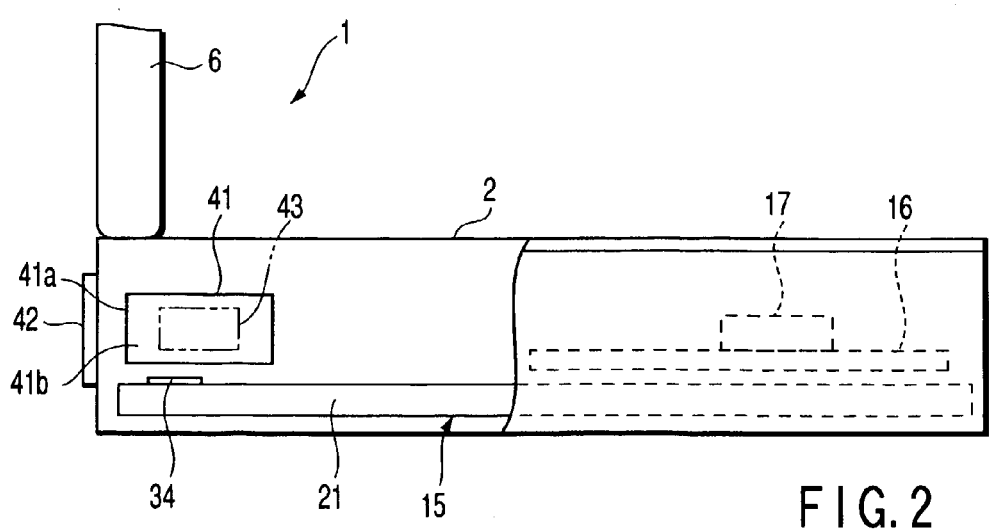
FIG. 2 is a partially-cutaway side view of the main body of the notebook PC.
Figure 3:
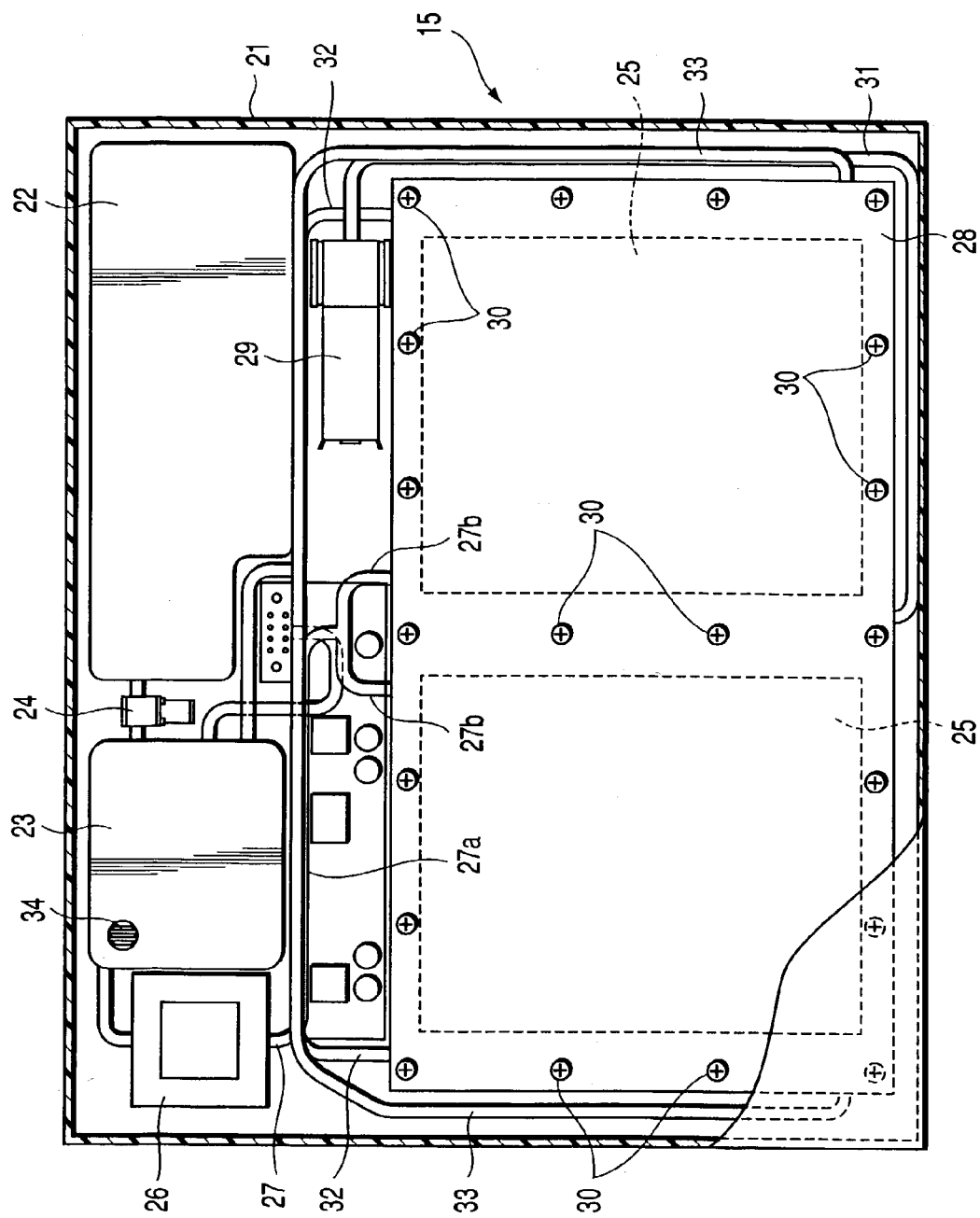
FIG. 3 is a plan view showing the upper portion of the casing of a fuel cell in a state where part of the upper surface is cut away.

A DMFC, which uses methanol as a liquid fuel, is employed as the fuel cell 15. As FIGS. 2 and 3 show, the fuel cell 15 comprises a casing 21 that can be received inside the main board 2. As FIG. 3 shows, a fuel tank 22 is disposed inside the casing 21, and the fuel tank 22 contains a high concentration of methanol used as a liquid fuel. The fuel tank 22 is connected to a mixing tank 23, and a first liquid-supply pump 24 supplies the methanol from the fuel tank 22 to the mixing tank 23.

The methanol supplied to the mixing tank 23 is diluted with water, which functions as a solvent and is supplied from a pair of fuel sell panels 25 to be described later. A second liquid-supply pump 26 is connected to the mixing tank 23. By the second liquid-supply pump 26, the diluted methanol is supplied toward the anodes of the fuel cell panels 25 through a liquid-supply pipe 27.

In the initial state, the mixing tank 23 contains diluted methanol, and the two fuel cell panels 25 also contain diluted methanol. Therefore, water (i.e., a solvent) does not have to be supplied to the mixing tank 23.

The liquid-supply pipe 27 includes a main pipe portion 27a and a pair of branch pipe portions 27b. The main pipe portion 27a has its one end connected to the outlet portion of the second liquid-supply pump 26. The branch pipe portions 27b are symmetric with respect to the other end of the main pipe portion 27a. In FIG. 3, the branch pipe portions 27b are shown as being connected to the upper side portion of the fuel cell panels 25.

As indicated by the dashed lines in FIG. 3, each of the two fuel cell panels 25 is rectangular. Two fuel cell panels 25 are arranged side by side and are held by two holding plates 28 (only one of which is shown) in such a manner that the upper and lower surfaces are in contact with the holding plates 28. The two holding plates 28 are secured by means of a plurality of fastening screws 30 located on the peripheral portions of the fuel cell panels 25.

The present embodiment employs two fuel cell panels 25, and these panels 25 are held between the holding plates 28. In comparison with the case where a single fuel cell panel is employed, the holding force is uniformly distributed onto the entire surfaces of the fuel cell panels, and the fuel cell panels 25 are allowed to maintain their desirable performance.

The liquid-supply pipe 27 has one end connected to the second liquid-supply pump 26 and the other end connected to the two branch pipe portions 27b. Through these branch pipe portions, the liquid-supply pipe 27 is connected to the fuel cell panels 25. In comparison with the case where the two fuel cells 25 are individually connected to piping, the overall length of the piping can be reduced. In addition, the paired fuel cell panels 25 can be supplied with a liquid fuel under the same condition.

An air-supply pump 29 supplies air through an air-supply tube 31 to the cathode of each fuel cell panel 25. The methanol and air supplied to each fuel cell panel 25 react in an electrolyte film, which is located between the anode and the cathode.

This reaction generates power between the anode and the cathode. Simultaneously, carbon dioxide is produced from the anode, and water is produced from the cathode. The carbon dioxide produced from the anode is supplied to the mixing tank 23 by way of the corresponding one of discharge-liquid tubes 33. On the other hand, the water produced from the cathode is supplied through the corresponding one of discharge-gas tubes 32 into the mixing tank 23 in the state of vapor. The mixing tank 23 has a discharge section 34 that allows only gas to pass therethrough. The discharge section 34 is open in the upper surface of the casing 21 of the fuel cell 15. The carbon dioxide and the vapor returned into the mixing tank 23 by way of the discharge-liquid tubes 33 and discharge-gas tubes 32, are discharged from the discharge section 34.

Figure 4:
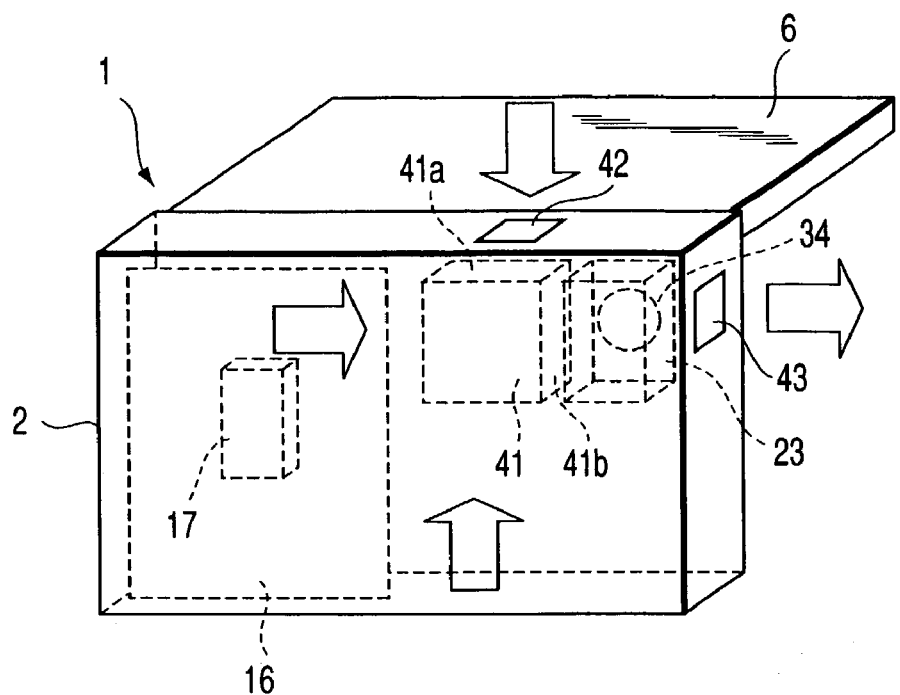
FIG. 4 is a simplified perspective view showing the lower portion of the notebook PC.

As FIGS. 2 and 4 show, a cooling fan 41 is provided inside the main body 2 of the notebook PC 1. The cooling fan 41 cools the electronic components, including CPU 17. The cooling fan 41 includes an inlet 41a (i.e., a suction section) and an outlet 41b (i.e., a discharge or delivery section). The inlet 41a is opposed to an air take-in port 42 formed in the back face of the main body 2, and the outlet 41b is opposed to an air discharge port 43 formed in a side surface of the main body 2. The air take-in port 42 and the discharge port 43 are comparatively close to each other (the air take-in port 42 in the back face and the discharge port 43 in the side surface are close to the same corner of the main body 2).

The fuel cell 15 is disposed inside the main body 2 in such a manner that the discharge section 34 of the mixing tank 23 is opposed to the discharge port 43 formed in the main body 2. In the present embodiment, the discharge section 34 is located between the outlet 41b of the cooling fan 41 and the discharge port 43 of the main body 2. FIG. 4 shows only the mixing tank 23 of the fuel cell 15, which is disposed inside the main body 2.

When the notebook PC 1 is used at places where the AC adapter 13 is not available, the changeover switch (not shown) provided for the main body 2 is operated so that the power supply section 11 is driven by the fuel cell 15.

Upon operation of the changeover switch, the fuel cell 15 is actuated, methanol, which has been supplied from the fuel tank 22 to the mixing tank 23 and diluted with water, is supplied to the fuel cell panel 25. In addition, air is supplied to the fuel cell panel 25 by the air-supply pump 29. As a result, the methanol and the air react with each other in the electrolyte film of the fuel cell panel 25. Power, thus generated between the anode and the cathode, is applied to the power supply section 11.

When the fuel cell 15 is actuated, carbon dioxide is generated from the anode, while water is generated from the cathode. The carbon dioxide and the water are returned to the mixing tank 23. The carbon dioxide returned to the mixing tank 23 is discharged into the interior of the main body 2 through the discharge section 34 of the mixing tank 23 in the state where the carbon dioxide contains vapor.

The discharge section 34 is opposed to the discharge port 43 of the main body 2. The cooling fan 41 has its outlet 41b opposed to the discharge port 43. The cooling fan 41 is turned on in response to an operation of the notebook PC 1.

When the cooling fan 41 is turned on, air is sucked into the interior of the main body 2 through the air take-in port 42 of the main body 2, as shown in FIG. 4. Air is also introduced into the interior through another air take-in port (not shown). Then, the air is blown out from the outlet 41b of the cooling fan 41, passes through the region above the discharge section 34 of the mixing tank 23, and is discharged from the main body 2 through the discharge port 43.

The CPU 17 and other electronic devices are cooled by the air that flows inside the main body 2 in the manner described above. It should be noted that the air introduced into the interior of the main body 2 and blown out from the outlet 41b of the cooling fan 41 passes through the region above the discharge section 34 of the mixing tank 23 and is then discharged from the main body 2 through the discharge section 34. Owing to this feature, the vapor-containing carbon dioxide from the discharge section 34 is discharged from the main body through the discharge port 43, together with the air.

In other words, as soon as the vapor-containing carbon dioxide is discharged into the main body 2 from the discharge section 34 of the mixing tank 23, the cooling fan 41 discharges that carbon dioxide from the main body 2 through the discharge port 43 of the main body 2 without allowing the carbon dioxide to stay in the main body 2. Hence, the carbon dioxide is not diffused inside the main body 2 and therefore does not flow toward the electronic-device portions of the main board 16.

For this reason, the vapor contained in the carbon dioxide is prevented from condensing on the main body 16 or on the CPU 17 or other electronic devices mounted on the main body 16.

Figure 6:
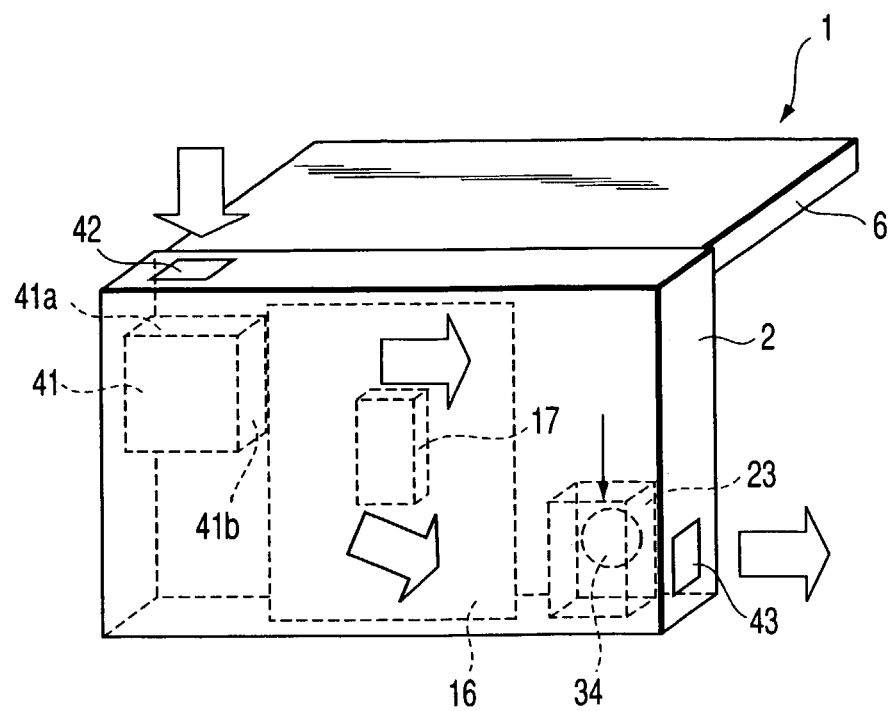
FIG. 6 is a simplified perspective view showing the lower portion of a notebook PC according to the second embodiment of the present invention.

FIG. 6 shows the second embodiment of the present invention. The second embodiment is similar to the first embodiment in that the discharge section 34 of the mixing tank 23 is opposed to the discharge port 43 of the main body 2. In the second embodiment, however, the discharge port 43 is located at the front portion of one side wall of the main body 2, and the air take-in port 42 in the rear wall of the main body 2 is diagonally opposite to the discharge port 43. In other words, the discharge port 43 and the air take-in port 42 is at positions far away from each other.

The cooling fan 41 has its inlet 41a opposed to the air take-in port 42 and its outlet 41b directed toward the main board 16, which is located between the cooling fan 41 and the mixing tank 23.

When the cooling fan 41 is turned on, air is drawn into the interior of the main body 2 from the air take-in port 42. After cooling the main board 16 and the CPU 17 and other electronic devices mounted on the main board 16, the air passes through the region above the mixing tank 23. Then, the air is discharged from the main body 2.

In the second embodiment, the discharge section 34 of the mixing tank 23 is opposed to the discharge port 43 of the main body 2. With this structure, the vapor-containing carbon dioxide which is to be discharged from the discharge port 43 is not diffused in the main body 2. It does not flow toward the CPU 17 or other electronic devices arranged inside the main body 2, let alone condense on them.

Figure 7:
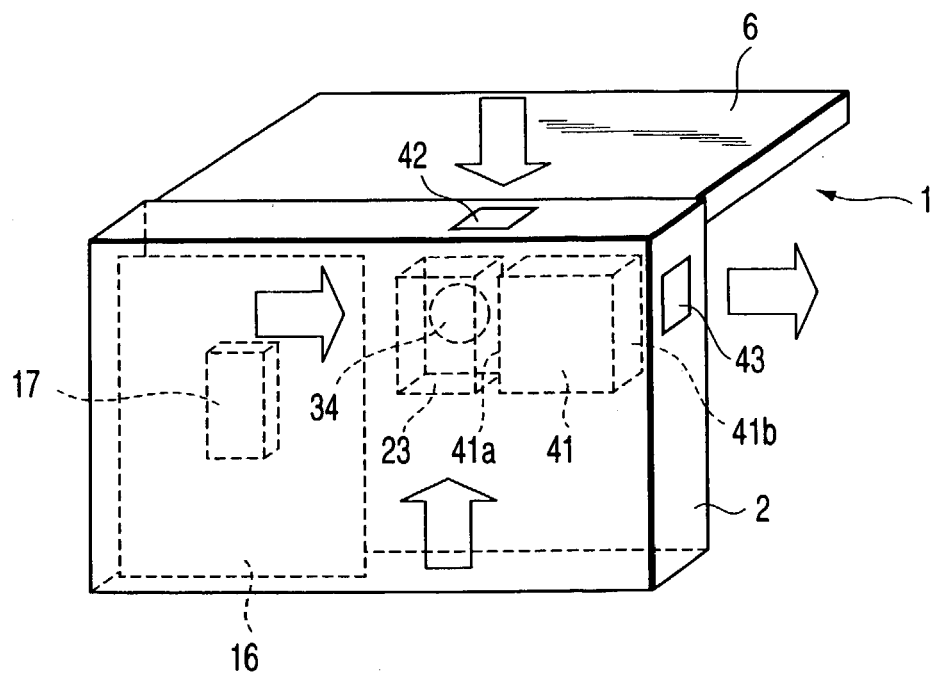
FIG. 7 is a simplified perspective view showing the lower portion of a notebook PC according to the third embodiment of the present invention.

FIG. 7 shows the third embodiment of the present invention. In the third embodiment, the air take-in port 42 formed in the rear surface of the main body 2 and the discharge port 43 formed in one side surface of the main body 2 are comparatively close to each other. They are comparatively close to one corner of the main body 2. The cooling fan 41 is disposed in the main body 2 in such a manner that its outlet 41b is opposed to the discharge port 43. The mixing tank 23 is located between the inlet 41a of the cooling fan 41 and the air take-in port 42. The discharge section 34 of this mixing tank 23 is opposed to the air take-in section 42.

The main board 16 on which the CPU 17 is mounted is located in the right half region of the main body 2, i.e., in the region where the discharge port 43 is not provided.

When the cooling fan 41 is turned on, air is drawn into the interior of the main body 2 from the air take-in port 42. Although not shown, the main body 2 has other air take-in ports as well. Because of the formation of those air take-in ports, the air streams indicated by the arrows in FIG. 7 are produced.

The air introduced into the main body 2 flows toward the inlet 41a of the cooling fan 41. Since the discharge section 34 of the mixing tank 23 is also opposed to the inlet 41a, not only the air introduced into the main body 2 but also the vapor-containing carbon dioxide discharged from the discharge section 34 of the mixing tank 23 is also sucked into the discharge section 34 of the mixing tank 23. In this manner, the air and the vapor-containing carbon dioxide are discharged from the outlet 41b of the cooling fan 41. Hence, they are not diffused inside the main body 2.

In the third embodiment as well, the vapor-containing carbon dioxide discharged from the mixing tank 23 of the fuel cell 15 can be discharged without allowing it to pass through the regions where electronic devices, including the main board 16 of the main body 2, are provided. Hence, the vapor does not condense on the electronic devices.

In the above descriptions of the first to third embodiments, reference was made to the case where the fuel cell 15 was disposed inside the main body 2 of the notebook PC 1. In this case, the fuel tank 22, the mixing tank 23, the fuel cell panel 25 and other structural components of the fuel cell 15 need not be integrally provided as one body; they may be disposed at predetermined positions inside the main body separately from one another.

This structure enhances the degree of freedom with which the structural components are arranged. Hence, the mixing tank 23 can be easily disposed at the position shown in each of the first to third embodiments.

Figure 8:
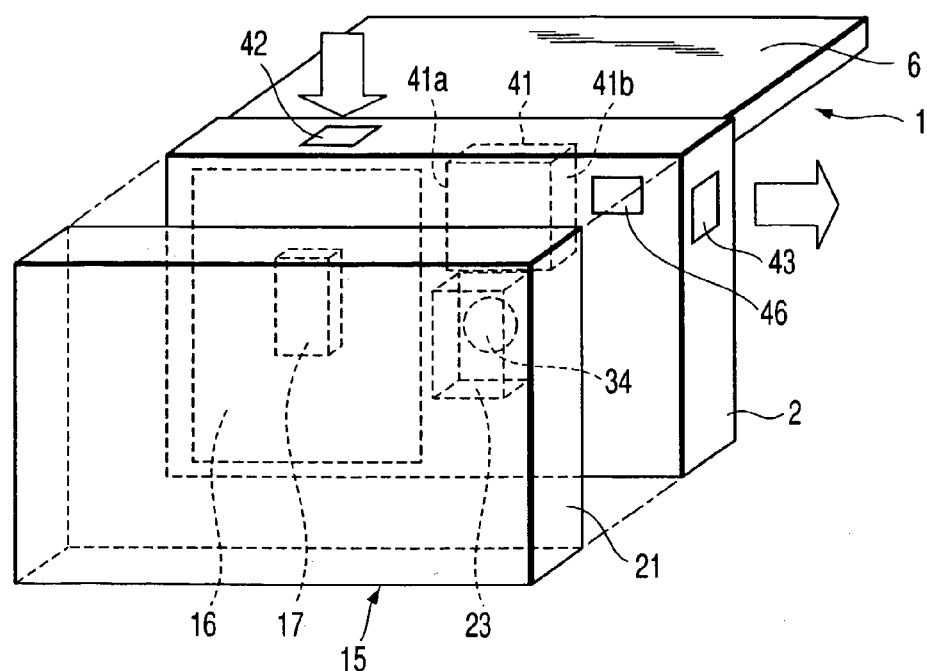
FIG. 8 is a simplified perspective view showing the lower portion of a notebook PC according to the fourth embodiment of the present invention.
Figure 9:
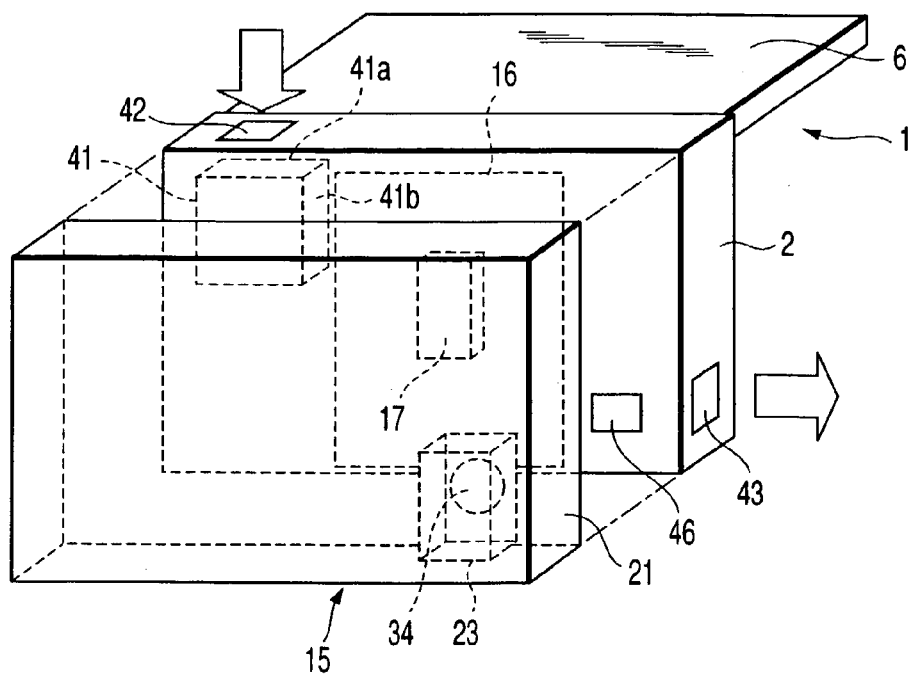
FIG. 9 is a simplified perspective view showing the lower portion of a notebook PC according to the fifth embodiment of the present invention.
Figure 10:
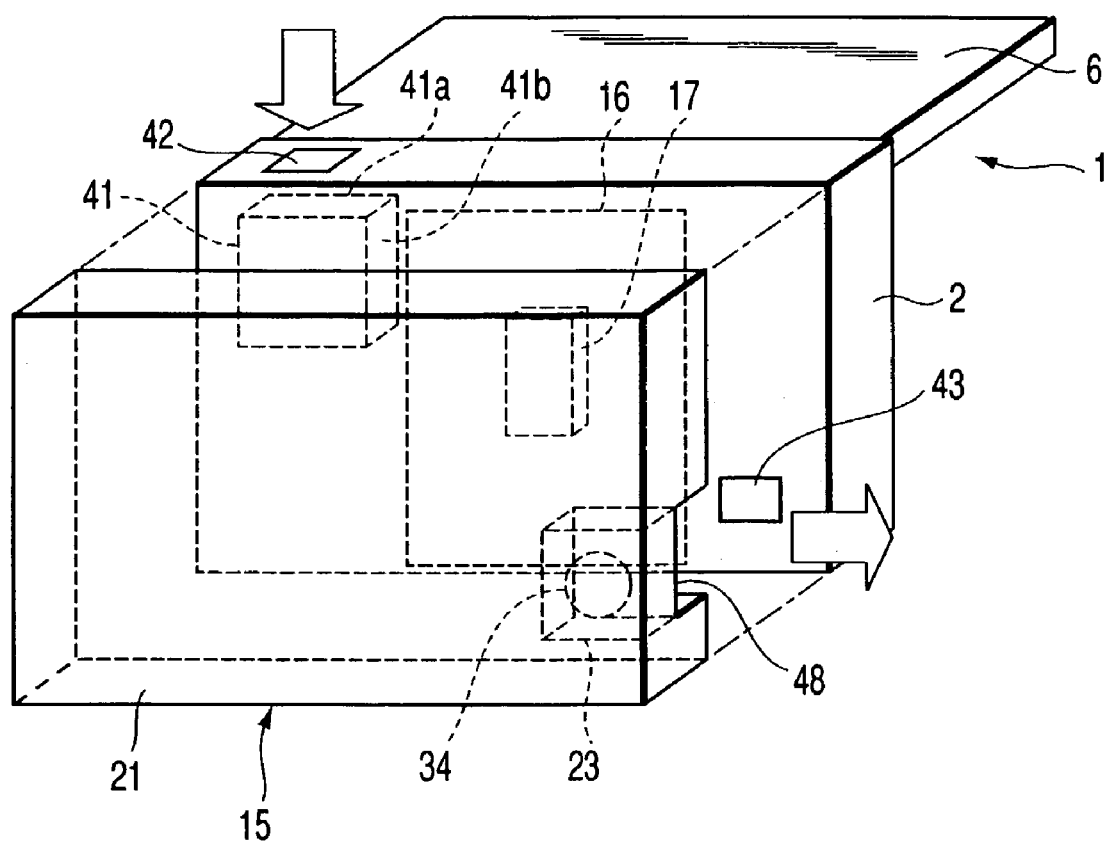
FIG. 10 is a simplified perspective view showing the lower portion of a notebook PC according to the sixth embodiment of the present invention.

FIGS. 8 through 10 show the fourth to sixth embodiments of the present invention, respectively. In these embodiments, the fuel cell 15 is provided on the outer surface of the bottom of the main body 2 of the notebook PC 1. The structural components of the fuel cell 15 are disposed inside the casing 21 in the same manner as in the first embodiment described with reference to FIG. 3, and the casing 21 containing these components is provided on the bottom of the main body 2.

In the fourth embodiment shown in FIG. 8, a vapor-introducing port 46 is formed in the bottom surface of the main body 2 in such a manner that the port 46 is close to one side surface of the main body 2. Through this port 46, the vapor-containing carbon dioxide discharged from the discharge section 34 of the mixing tank 23 of the fuel cell is introduced into the interior of the main body 2. When the bottom surface of the main body 2 is placed on the upper surface of the casing 21 of the fuel cell 15, the discharge section 34 is opposed to the vapor-introducing port 46.

A cooling fan 41 is disposed inside the main body 2 in such a manner that its outlet 41b is opposed to the discharge port 43. The vapor-introducing port 46 described above is located between the outlet 41b and the discharge port 43. The inlet 41a of the cooling fan 41 is directed to the air take-in port 42 formed in the rear surface of the main body 2. The main board 16 on which the CPU 17 is mounted is located in the right half region of the main body 2, i.e., in the region where the vapor-introducing port 46 is not provided.

When the cooling fan 41 is turned on, air is drawn into the interior of the main body 2 from the air take-in port 42. In the main body 2, the air is sucked into the inlet 41a of the cooling fan 41 and flows out of the outlet 41b. The air is discharged from the discharge port 43 to which the outlet 41b is opposed.

When the fuel cell is used, vapor-containing carbon dioxide is discharged from the discharge section 34 of the mixing tank 23 of the fuel cell. The carbon dioxide enters the main body 2 from the vapor-introducing port 46 formed in the bottom of the main body 2 and opposed to the discharge section 34. Thereafter, the vapor-containing carbon dioxide is discharged from the discharge port 43 of the main body 2, together with the air discharged from the outlet 41b of the cooling fan 41.

When the fuel cell 15 is placed on the lower surface of the main body 2, the vapor-containing carbon dioxide discharged from the upper surface of the casing of the fuel cell 15 becomes a problem. The present embodiment solves this problem by guiding the carbon dioxide from the vapor-introducing port 46 formed in the bottom of the main body 2 to the outlet 41b of the cooling fan 41 of the main body 2 and discharging the carbon dioxide from the discharge port 43 together with air.

As can be seen from this, even where the fuel cell 15 is provided on the outer surface of the bottom of the main body 2 of the notebook PC 1, the vapor-containing carbon dioxide generated by the fuel cell can be discharged reliably by means of the cooling fan 41 provided in the main body 2. In addition, the vapor-containing carbon dioxide can be discharged without making it pass through the regions where the CPU 17 or other electronic devices are provided. Hence, no condensation is caused on the electronic devices.

FIG. 9 shows the fifth embodiment of the present invention. In the fifth embodiment, an air take-in port 42 is formed in the rear surface of the main body 2 in such a manner that it is close to the right end of the main body 2. The inlet 41a of the cooling fan 41 is opposed to the air take-in port 42.

A discharge port 43 is formed in one side surface of the main body 2 in such a manner that it is located close to the front surface. The vapor-introducing port 46 is formed in the bottom on the main body 2 in such a manner that it is located close to the discharge port 43. The main board 16 on which the CPU 17 is mounted is located between the vapor-introducing port 46 and the outlet 41b of the cooling fan 41.

When the main body 2 is placed on the upper surface of the casing 21, the discharge section 34 of the mixing tank 23 is opposed to the vapor-introducing port 46.

When the cooling fan 41 is turned on, air is drawn into the interior of the main body 2 from the air take-in port 42. In the main body 2, the air output from the outlet 41b of the cooling fan 41 cools the CPU 17 mounted on the main board 16, and is then discharged from the main body 2 through the discharge port 43.

Before being discharged from the discharge port 43, the air flows through the region above the vapor-introducing port 46. From this port 46, the vapor-containing carbon dioxide generated by the fuel cell 15 is introduced into the main body 2. The carbon dioxide is therefore discharged from the discharge port 53 together with the air described above.

Like the fourth embodiment shown in FIG. 8, the fifth embodiment does not diffuse the vapor-containing carbon dioxide inside the main body 2. To be more specific, the vapor-containing carbon dioxide generated by the fuel cell 15 and introduced into the main body 2 of the notebook PC 1 is not diffused inside the main body 2. Because of the operation of the cooling fan 41, the vapor-containing carbon dioxide can be discharged from the discharge port 43, without being diffused in the main body 2 and without passing through the region where the CPU 17 is provided.

Although the vapor-containing carbon dioxide is made to pass through the region inside the main body 2 because of the operation of the cooling fan 41, the vapor does not condense on the electronic devices (e.g., CPU 17) arranged inside the main body 2.

FIG. 10 shows the sixth embodiment of the present invention. The sixth embodiment is similar to the fifth embodiment shown in FIG. 9 in light of the structure of the main body 2 of the notebook PC 1. In the sixth embodiment, however, the vapor-introducing port 46 is not formed in the bottom of the main body 2, and the discharge port 43 is formed instead.

The casing 21 of the fuel cell 15 has a hollow section 48 which is open in both the upper surface and one side surface of the casing 21. The discharge section 34 of the mixing tank 23 provided inside the casing 21 is formed in the bottom of the hollow section 48. When the main body 2 is laid on the upper surface of the casing 21 of the fuel cell 15, the discharge section 34 is opposed to the discharge port 43. The discharge section 34 is open in the bottom surface of the hollow section 48, and is located away from the hollow section 48 by a predetermined distance.

When the cooling fan 41 is turned on, air is drawn into the interior of the main body 2 from the air take-in port 42. In the main body 2, the air cools the main board 16 and the CPU 17 mounted thereon, and is then discharged from the main body 2 through the discharge port 43 and through the hollow section 48 of the casing 21 of the fuel cell 15.

On the other hand, the vapor-containing carbon dioxide is discharged into the hollow section 48 from the discharge section 34 of the mixing tank 23 of the fuel cell 15. The carbon dioxide is then guided out of the hollow section 48 by the cooling fan 41, along with the gasses flowing out from the discharge port 43 of the main body 2.

As can be seen from the above, the sixth embodiment does not permit the vapor-containing carbon dioxide generated by the fuel cell 15 to enter the main body. The carbon dioxide is guided in a predetermined direction by the cooling fan 41 and discharged reliably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main body;
   a fuel cell configured to supply power to the main body and generate vapor-containing gas during operation; and
   a fan configured to exhaust air and the vapor-containing gas generated by the fuel cell from the main body through a discharge port formed in the main body,
   wherein the main body includes an air take-in port, the fan is located inside the main body and includes an inlet and an outlet opposed to the discharge port, and the fuel cell includes a portion configured to generate the vapor-containing gas and located between the inlet of the fan and the air take-in port.

2. An electronic apparatus comprising:
a main body;
a fuel cell configured to supply power to the main body and generate vapor-containing gas during operation; and
a fan configured to exhaust air and the vapor-containing gas generated by the fuel cell from the main body through a discharge port formed in the main body,
wherein the fuel cell is located outside the main body, the main body includes a vapor-introducing port and the fuel cell includes a portion configured to generate the vapor-containing gas and opposed to the vapor-introducing port.

3. An electronic apparatus comprising:
a main body including an air take-in port and a discharge port and containing an electronic device;
a fuel cell configured to supply power to the electronic device and including a discharge portion from which a vapor-containing gas generated during operation is discharged, the fuel cell being integral with the main body, with the discharge portion opposed to the discharge port; and
a fan located inside the main body and including an inlet and a discharge section, the inlet and the discharge section being directed to the air take-in port and the discharge port, respectively, air being introduced into the main body from the air take-in port and discharged from the discharge port together with the vapor-containing gas discharged from the discharge portion.

4. The electronic apparatus according to claim 3, wherein the fuel cell is located inside the main body.

5. The electronic apparatus according to claim 3, wherein the fuel cell is located outside the main body.

6. The electronic apparatus according to claim 3, wherein the discharge portion of the fuel cell is located between the outlet of the fan and the discharge port of the main body.

7. The electronic apparatus according to claim 3, wherein the electronic device is located at a position away from a gas passage of the vapor-containing gas, the vapor-containing gas being discharged from the discharge portion of the fuel cell and expelled from the main body through the discharge port by the fan.

8. The electronic apparatus according to claim 3, wherein the discharge portion of the fuel cell is opposed to the discharge port, which is formed at one end of the main body, the fan is opposed to the air take-in port, which is formed at another end of the main body, and the electronic device is located between the discharge portion of the fuel cell and the discharge section of the fan.

9. The electronic apparatus according to claim 3, wherein the outlet of the fan is opposed to the discharge port, which is near one end of the main body, the discharge portion of the fuel cell is located between the air take-in port, which is near the one end of the main body, and the inlet of the fan, and the electronic device is near another end of the main body.

10. The electronic apparatus according to claim 2, wherein the main body contains an electronic device, and the fan causes the vapor-containing gas generated by the fuel cell to be discharged from the main body without the vapor-containing gas passing through a region where the electronic device is located.

* * * * *